US007009740B2

(12) United States Patent
Sakai

(10) Patent No.: US 7,009,740 B2
(45) Date of Patent: Mar. 7, 2006

(54) IMAGE PROCESSING APPARATUS, IMAGE PROCESSING METHOD AND RECORDING MEDIUM

(75) Inventor: Takashi Sakai, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 810 days.

(21) Appl. No.: 09/915,598

(22) Filed: Jul. 26, 2001

(65) Prior Publication Data
US 2002/0054391 A1 May 9, 2002

(30) Foreign Application Priority Data
Jul. 28, 2000 (JP) .............................. 2000-229492

(51) Int. Cl.
*H04N 1/46* (2006.01)

(52) U.S. Cl. ...................... 358/514; 358/513; 358/512

(58) Field of Classification Search ............... 358/514, 358/513, 512, 482, 483, 474, 497, 494, 505, 358/506; 250/208.1; 348/294, 297, 298, 348/241, 243, 242, 245, 250, 96, 97; 382/312, 382/318, 319
See application file for complete search history.

(56) References Cited

U.S. PATENT DOCUMENTS

| 5,771,070 A | * | 6/1998 | Ohzu et al. ............... 348/241 |
| 6,507,365 B1 | * | 1/2003 | Nakamura et al. .......... 348/296 |
| 6,747,699 B1 | * | 6/2004 | Ohzu et al. ............... 348/294 |

FOREIGN PATENT DOCUMENTS

| JP | A 6-233054 | 8/1994 |
| JP | A 11-55509 | 2/1999 |

OTHER PUBLICATIONS

English Translation of an extract of Japanese Patent Application Laid-Open No. 11-55509.

* cited by examiner

*Primary Examiner*—Cheukfan Lee
(74) *Attorney, Agent, or Firm*—Morgan & Finnegan, LLP

(57) ABSTRACT

An image processing apparatus easily and reliably realizes complicated 1-line processing by a simple method, and controls accumulation period for respective colors without any particular function such as shutters on the line sensor side. One line period is divided into a reading section for reading valid image data, a dummy section for sweeping electric charge accumulated in the reading section and for synchronization, and a section for setting accumulation periods for the respective colors. In the reading section, the line sensor is driven by a necessary transfer frequency, and in the other sections, the sensor is driven at a high speed.

14 Claims, 10 Drawing Sheets

IMAGE PROCESSING APPARATUS, IMAGE PROCESSING METHOD AND RECORDING MEDIUM

FIELD OF THE INVENTION

The present invention relates to an image processing apparatus having a sensor which photoelectric-converts light from an original or the like then accumulates the obtained signal and outputs the signal, and an image processing method for the apparatus.

BACKGROUND OF THE INVENTION

An image processing apparatus which reads an original on a glass plate and sends image data to a host computer or the like is known. As the original, a document type original such as an article of magazine or the like, and a film type original such as a photographic film are used. In use of the former original, light reflected from the original is read, and in use of the latter original, light transmitted through the original is read. Image processings respectively characteristic of these original types are performed.

As the image sensor of the image processing apparatus, a line sensor such as a CCD is used. Especially, as a sensor for reading a color original, a 3-line color sensor with 3 arrays of line sensors, having color filters formed on photoelectric conversion devices, is often employed. In the image reading apparatus, two-dimensional image data is read by moving the above-described line sensor orthogonally to a direction along the array of photoreception devices.

FIG. 8 is a schematic view showing the structure of the CCD line sensor.

Numeral 802 denotes shift gates which are closed during a storage period. A photoreception device portion 801 accumulates electric charge while performing photoelectric conversion during a photoreception period. When the shift gates 802 are opened, the accumulated electric charge is moved to shift registers 803. At this time, electric charge at odd-numbered photoreception devices and electric charge at even-numbered photoreception devices, in one line, are respectively moved to separate registers on both sides. The moved electric charge are transferred via the shift registers.

FIG. 9 is a timing chart showing a drive pulse and 1-line data processing.

Symbol Hsync denotes a period required for moving the sensor in a subscanning direction to read one line of image, i.e., a period for image processing for one line in the system. Symbol SH denotes a signal supplied to the shift gates of the sensor. When the signal is at a LOW level, the shift gates are closed, on the other hand, when the signal is at a HIGH level, the shift gates are open and accumulated electric charge is transferred to the shift registers. The period of the signal corresponds to the storage period of the line. Numerals $\phi 1$ and $\phi 2$ denote drive signals for the shift registers. The transfer frequency of the pulses corresponds to the transfer speed. In this manner, all the pixels are transferred as image data within the storage period.

Generally, the image processing apparatus performs various image processings to obtain an ideal output image. Color balance adjustment performed upon color image reading is one of those processings. Generally, in the image sensor, the color balance is not completely adjusted among R, G and B of output signal due to influence of light source lamp and/or color filters.

Further, when a transmission-type original such as a positive film or a negative film is read by the same system, the color balance must be adjusted in consideration of film density or the like as well as the above factors. Especially, when a negative film is read, tonality must be adjusted for each original.

As to these requirements, gain control of analog signal, processing on AD-converted digital data and the like can be made. Further, a color sensor may be supplied with a shutter function to control exposure for each color. In this sensor, photoreception and storage portions are connected to shutter drains. Pulses are supplied to shutter gates to arbitrarily control actual storage periods.

FIG. 10 is a timing chart showing a driving method for the color sensor with the shutter function.

Storage periods SH_R, SH_G and SH_B of 3 color photoreception portions are the same, however, drive signals supplied to shutter gates are different for respective colors. When these signals are at a HIGH level, the gates are opened and electric charge is discharged to the shutter drains, while when the signals are at a LOW level, storage is started. In this manner, the actual electric-charge storage period can be changed for respective colors while synchronizing the 3 color lines. However, this function added to the sensor increases the costs, and further, widens the distance between the lines.

SUMMARY OF THE INVENTION

The present invention provides image processing apparatus and method which control storage period for respective colors without any particular function such as electronic shutters on the sensor side, and arbitrarily set storage periods without consideration of blooming or the limit of hardware processing speed in the subsequent stage.

To solve the above-described problem and attain the foregoing object, according to a first aspect of the present invention, the image processing apparatus has the following construction.

That is, provided is an image processing apparatus comprising: a line sensor which photoelectric-converts light into a signal then accumulates the signal, and outputs the signal as a 1-line electric signal; and a drive circuit which drives the line sensor such that one line period is divided into a first section for reading valid image data, a second section for storing dummy image data, and a third section for storing valid image data.

Further, according to a second aspect of the present invention, the image processing apparatus has the following construction.

That is, provided is an image processing apparatus comprising: plural photoreception storage portions which respectively perform photoelectric conversion and accumulate different color signals; and drive circuit which starts storage of new signal by reading signals accumulated in the photoreception storage portions, and sets storage periods for respective colors by changing timings of reading signals from the photoreception storage portions for the respective colors.

Further, according to a third aspect of the present invention, the image processing method has the following construction.

That is, provided is an image processing method comprising the steps of: photoelectric-converting light into a signal then accumulates the signal, and outputting the signal as a 1-line electric signal, by a line sensor; and driving the line sensor such that one line period is divided into a first section for reading valid image data, a second section for storing dummy image data, and a third section for storing the valid image data.

Further, according to a fourth aspect of the present invention, the image processing method has the following construction.

That is, provided is an image processing method for an image processing apparatus having plural photoreception storage portions which respectively perform photoelectric conversion and accumulate different color signals, wherein storage of new signal is started by reading signals accumulated in the photoreception storage portions, and storage periods are set for respective colors by changing timings of reading signals from the photoreception storage portions for the respective colors.

Further, a control program of the present invention has the following construction.

That is, the above image processing method is executed by a computer.

Further, a recording medium of the present invention has the following construction.

That is, the above control program is accumulated in a computer-readable recording medium.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
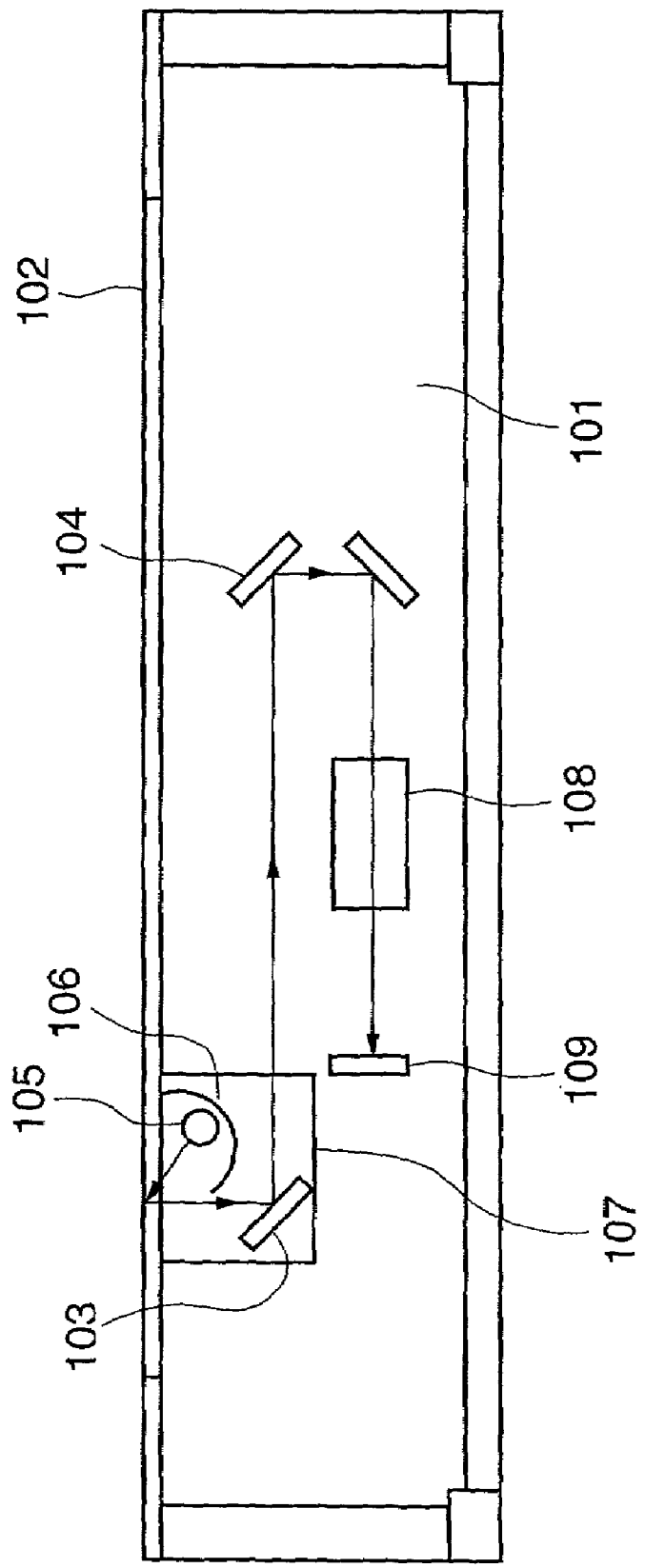
FIG. 1 is a cross-sectional view of an image processing apparatus main body according to the present invention.

FIG. 1 is a cross-sectional view of an image processing apparatus main body according to the present embodiment, cut at the center of a lens 108.

Numeral 101 denotes an image processing apparatus to read an original placed on a platen glass 102, by scanning, convert the read image information into digital information, and send the image information to a computer; 103, a first mirror which scan-reads the original placed on the platen glass 102 of the image processing apparatus 101; 104, a second mirror which moves at a speed ½ of that of the first mirror 103; 105, a fluorescent lamp which irradiates the original; 106, a reflector which collects light from the lamp to a reading position; 107, a carriage to which the lamp, the first mirror, the reflector and the like are fixed; 108, a image formation lens; and 109, a line sensor which converts the optical image information into an electric signal. As the first mirror 103 and the second mirror 104 move at speeds in the ratio of 1:0.5, a constant optical distance is maintained between the original on the platen glass 102 and the line sensor 109.

Figure 2:
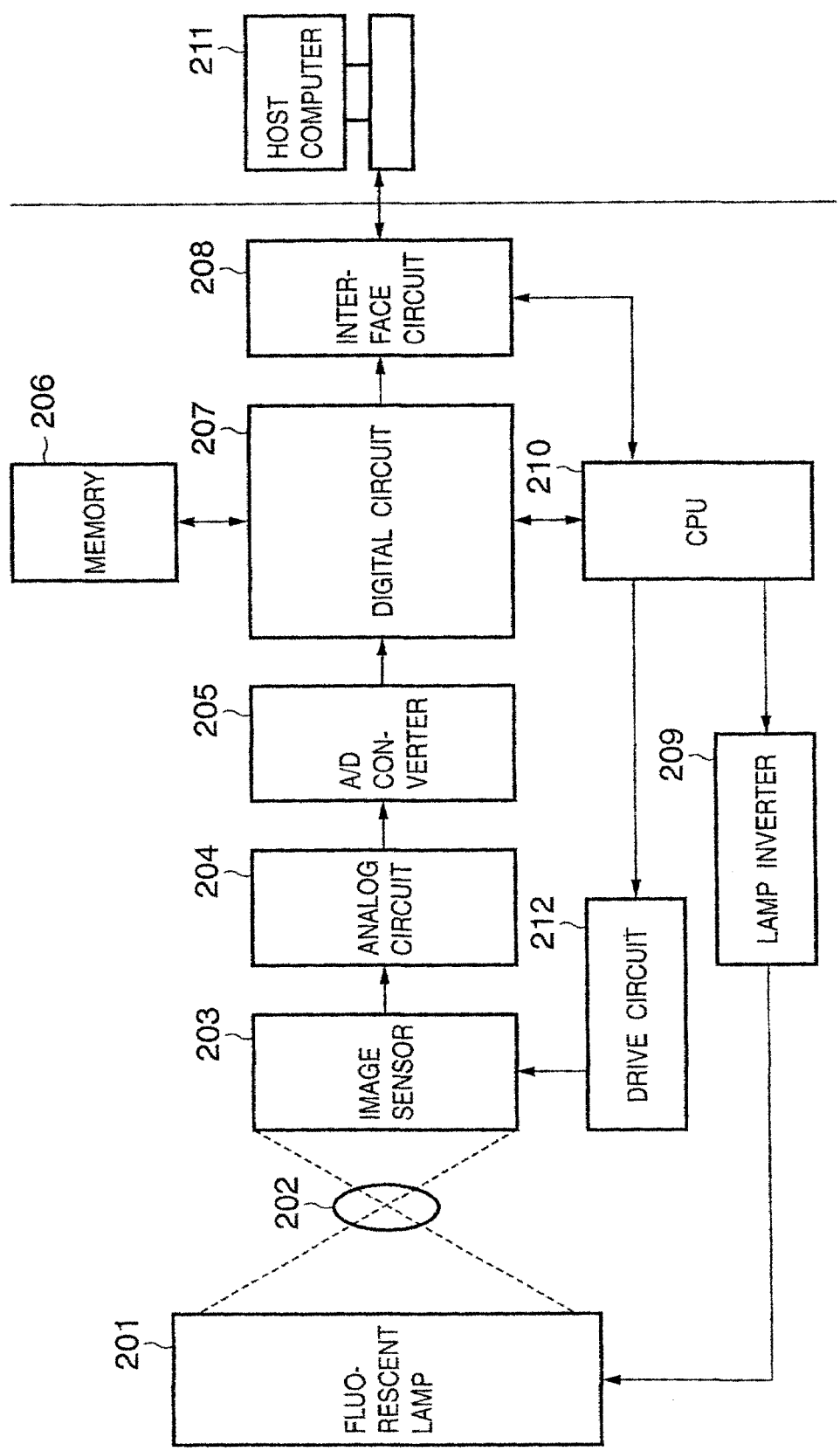
FIG. 2 is a block diagram of the image processing apparatus.

FIG. 2 is a block diagram of the image processing apparatus.

A lamp inverter 209 turns on a fluorescent lamp 201 based on a light-source ON/OFF control signal from a CPU 210. The light from the light source irradiates the original, and further, reflected light from the original enters the image sensor 203 through a image forming lens 202. The image sensor photoelectric-converts the reflected light and outputs an electric signal to an analog circuit 204. The analog circuit 204 performs analog processing such as amplification on the image signal from the sensor, and sends the signal to the A/D converter 205. The A/D converter 205 converts the analog signal received from the analog circuit 204 to a digital signal and outputs the signal to a digital circuit 207. Numeral 206 denotes a memory for temporarily storing shading data and work data for the CPU 210. In a digital processing block, necessary processing is performed on the digital image signal outputted from the A/D converter 205, and the data is sent to a subsequent-stage interface circuit 208. The interface circuit 208 transmits the processed image data to a host computer 211 in correspondence with a communication protocol. A drive circuit 212 outputs various pulses necessary for driving the image sensor 203, thereby controls the image sensor. The CPU 210 controls the digital circuit 207, the interface circuit 208, the lamp inverter 209, the drive circuit 212 and the like.

Figure 3:
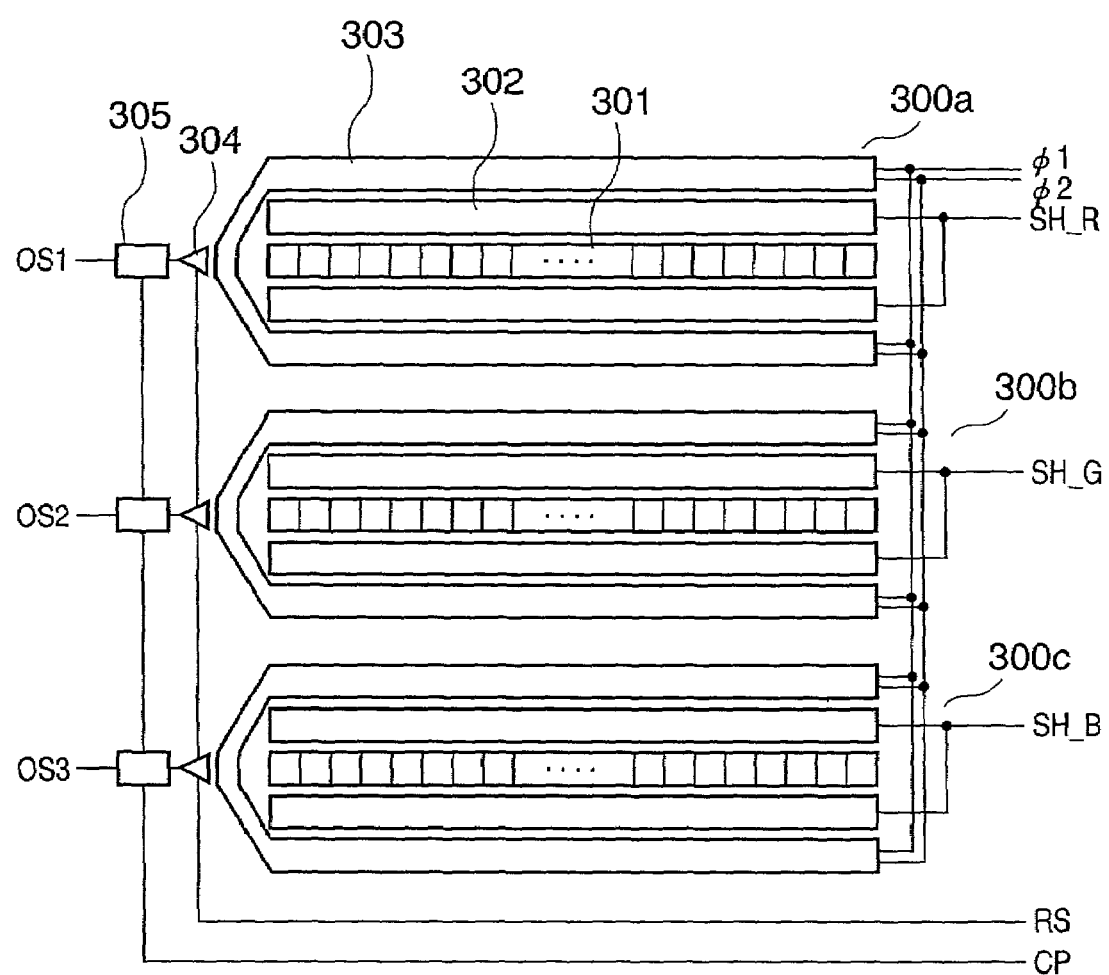
FIG. 3 is a schematic view of the inside of a 3-line color line sensor.

FIG. 3 is a schematic view of the inside of 3-line color line sensor.

Numeral 301 denotes a photoreception storage portion of the color line sensor which photoelectric-converts light received by photodiodes and stores electric charge; 302, a shift gate which is closed while the electric charge is accumulated, and opened when the electric charge accumulated in the storage portion is moved to a transfer register; and 303, the transfer register which transfers the electric charge moved from the storage portion to an output stage, pixel by pixel. In this embodiment, two signals φ1 and φ2 are alternately inputted into the transfer register. The electric charge is transferred by the signals of mutually opposite phases. Numeral 304 denotes a capacitor temporarily storing the electric charge, which resets the electric charge by a reset pulse (RS). Numeral 305 denotes a clamp circuit with a voltage clamped by a clamp pulse (CP) to a reference voltage. The transferred electric charge is outputted as image data electric signal through an output buffer.

Note that a red color filter is provided in the photoreception storage portion 301 of the line sensor 300a, a green color filter is provided in the photoreception storage portion 301 of the line sensor 300b, and a blue color filter is provided in the photoreception accumulation portion 301 of the line sensor 300c, respectively for storing and transmitting different color signals.

Figure 4:
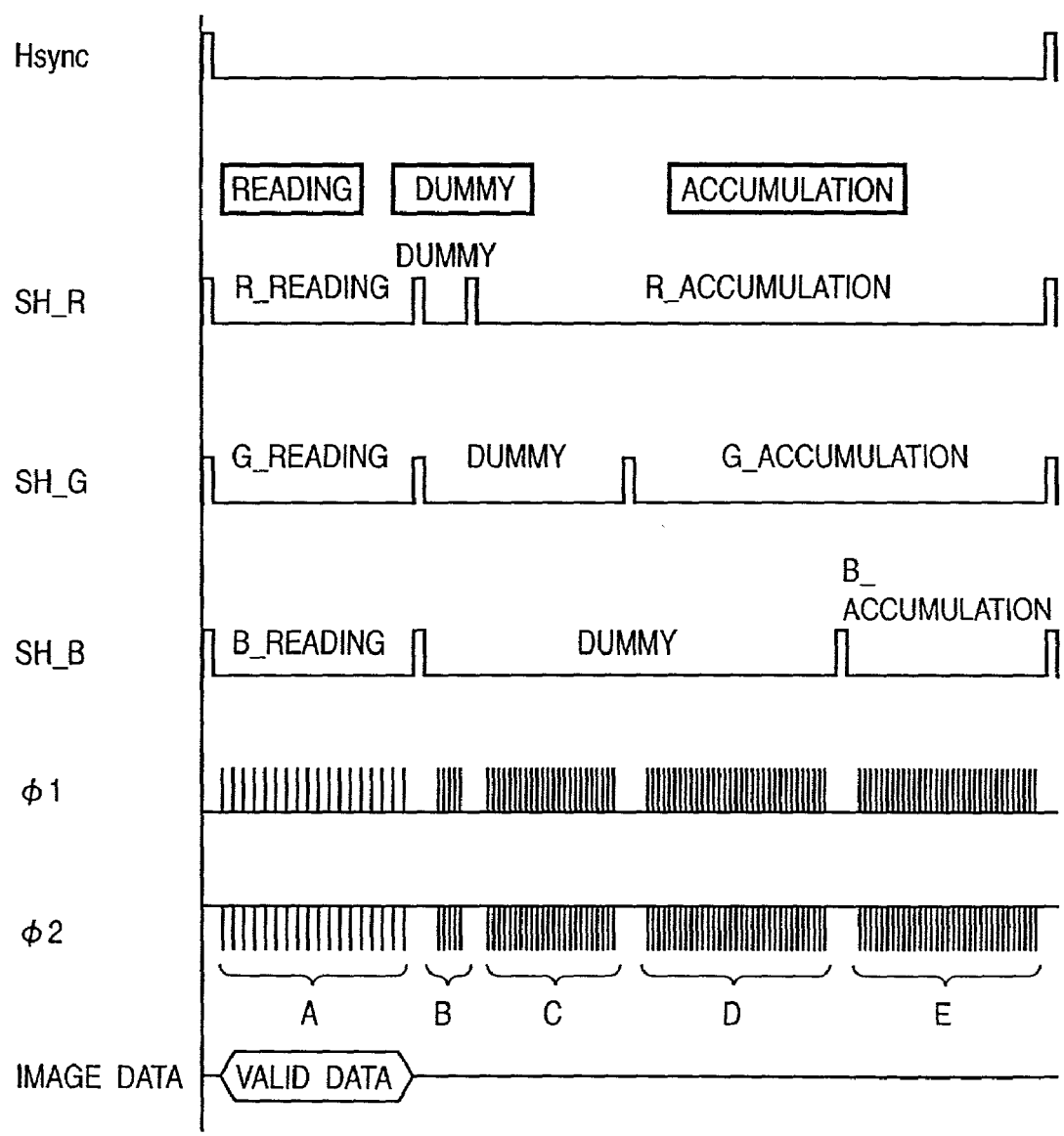
FIG. 4 is a timing chart explaining a driving method for the line sensor.

FIG. 4 is a timing chart for explaining a driving method for the line sensor controlled by a drive circuit, showing processing in 1-line period. Symbol Hsync denotes a horizontal synchronizing signal of a period required for reading one image line during which the sensor moves for one line in the subscanning direction. Symbols SH_R, SH_G and SH_B denote signals respectively supplied to the shift gates of the sensor. When the signals are at a LOW level, the shift gates are closed, and when the signals are at a HIGH level, the shift gate is opened, and the electric charge in the accumulation portion is transferred to the transfer resisters. Symbols $\phi 1$ and $\phi 2$ denote drive signals for the transfer register. The electric charge in the transfer register is transferred in correspondence with frequencies of these signals.

In FIG. 4, the period for one line is divided into three sections. First, immediately after the first section Hsync, valid image data is read out. All the shift gates of three line sensors 300a, 300b and 300c are opened with the Hsync, and electric charge accumulated in a previous line accumulation section is transferred, and processed as valid image data. In the previous line, different accumulation periods are set for the respective colors. The second section is provided for reading the electric charge accumulated in the photoreception accumulation portion 301 in the first section (B in FIG. 4), and for storing dummy electric charge for setting the third section to be described later to periods for the respective colors. That is, the timing of transferring dummy electric charge from the photoreception accumulation portion 301 to the transfer register 303 is shifted for the respective colors. In the third section, the accumulation periods are changed in accordance with settings. The accumulation data in this section are processed in the next line. Further, in the third section, the dummy electric charge accumulated in the second section is read (in FIG. 4, C indicates a pulse for reading the dummy electric charge from the line sensor 300a; D, a pulse for reading the dummy electric charge from the line sensor 300b; and E, a pulse for reading the dummy electric charge from the line sensor 300c). In this manner, one line, divided into a section for electric charge accumulation and sections for data reading, can be easily controlled. Further, signals to drive the sensor in the reading section is different from that in the other sections.

Figure 5:
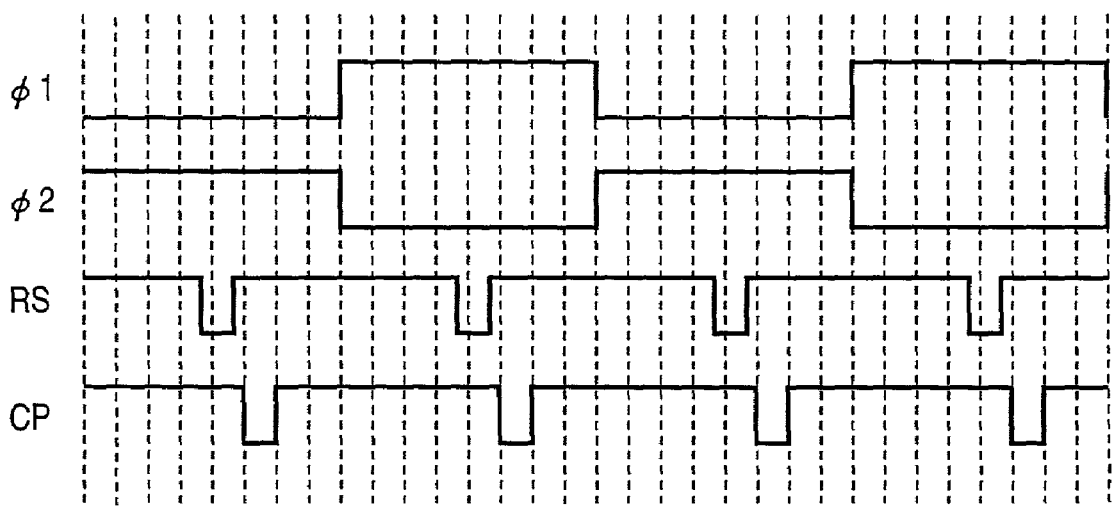
FIG. 5 is a timing chart showing signals φ1, φ2, RS and CP during a reading section.
Figure 6:
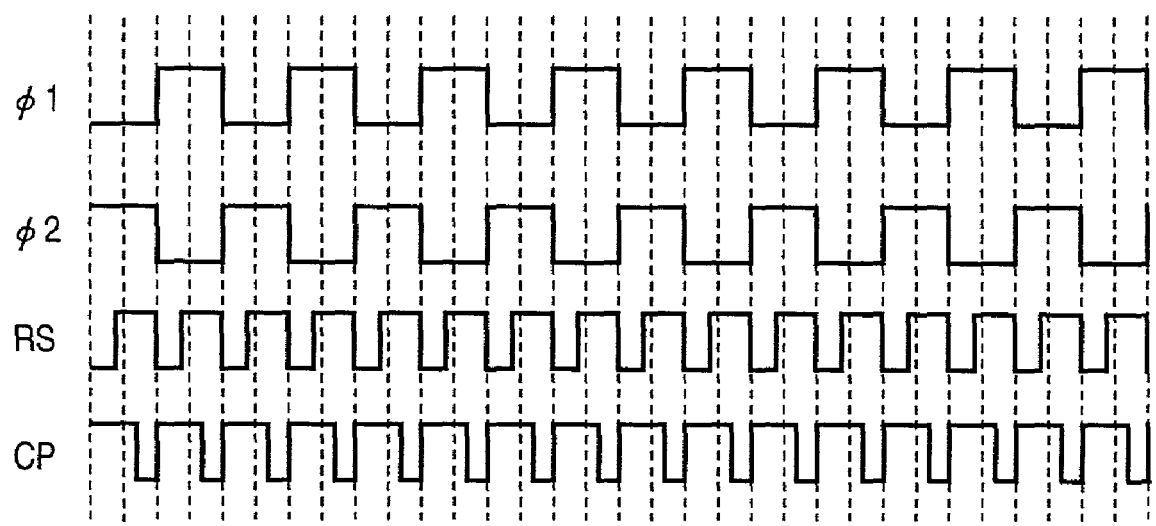
FIG. 6 is a timing chart showing signals in a dummy section and a storage section.

FIG. 5 shows the signals $\phi 1$, $\phi 2$, RS and CP in the reading section. FIG. 6 shows the signals in the dummy section and the accumulation section. In the present embodiment, in FIG. 6, the electric charge in the register is transferred at a speed 4 times that in FIG. 5. In this manner, in the sections other than the reading section, the electric charge is transferred at a high speed, thereby all the electric charge can be sent even if the electric charge accumulated in the accumulation period overflows the transfer register 203.

As described above, according to the present embodiment, the complicated 1-line processing in the line sensor 109 is easily and reliably realized by a simple method. Further, the accumulation periods can be controlled for respective colors without providing any particular function such as electronic shutters on the line sensor side. Further, the accumulation periods can be freely set for the respective colors without consideration of blooming and/or the limit of hardware processing speed in the subsequent stage.

<Second Embodiment>

In the above-described first embodiment, one line period is divided into three sections having independent functions, thereby the accumulation periods can be controlled for the respective colors. Further, the sensor drive signals used in the valid data reading section are different from those in other sections. In FIG. 4, the period of dummy section "B" is much shorter than that of reading section "A". In the present embodiment, the transfer frequency of the sensor for electric charge transfer is increased such that a product of the duration of the dummy section and the transfer frequency of the section is greater than the product of the duration of the reading section and the transfer frequency of the section, i.e., the number of cycles of the dummy section is greater than that of the reading section.

In this arrangement, in addition to the advantages in the first embodiment, obtained is an advantage that even if a short dummy section is set, all the electric charge in the register can be transferred.

<Third Embodiment>

Figure 7:
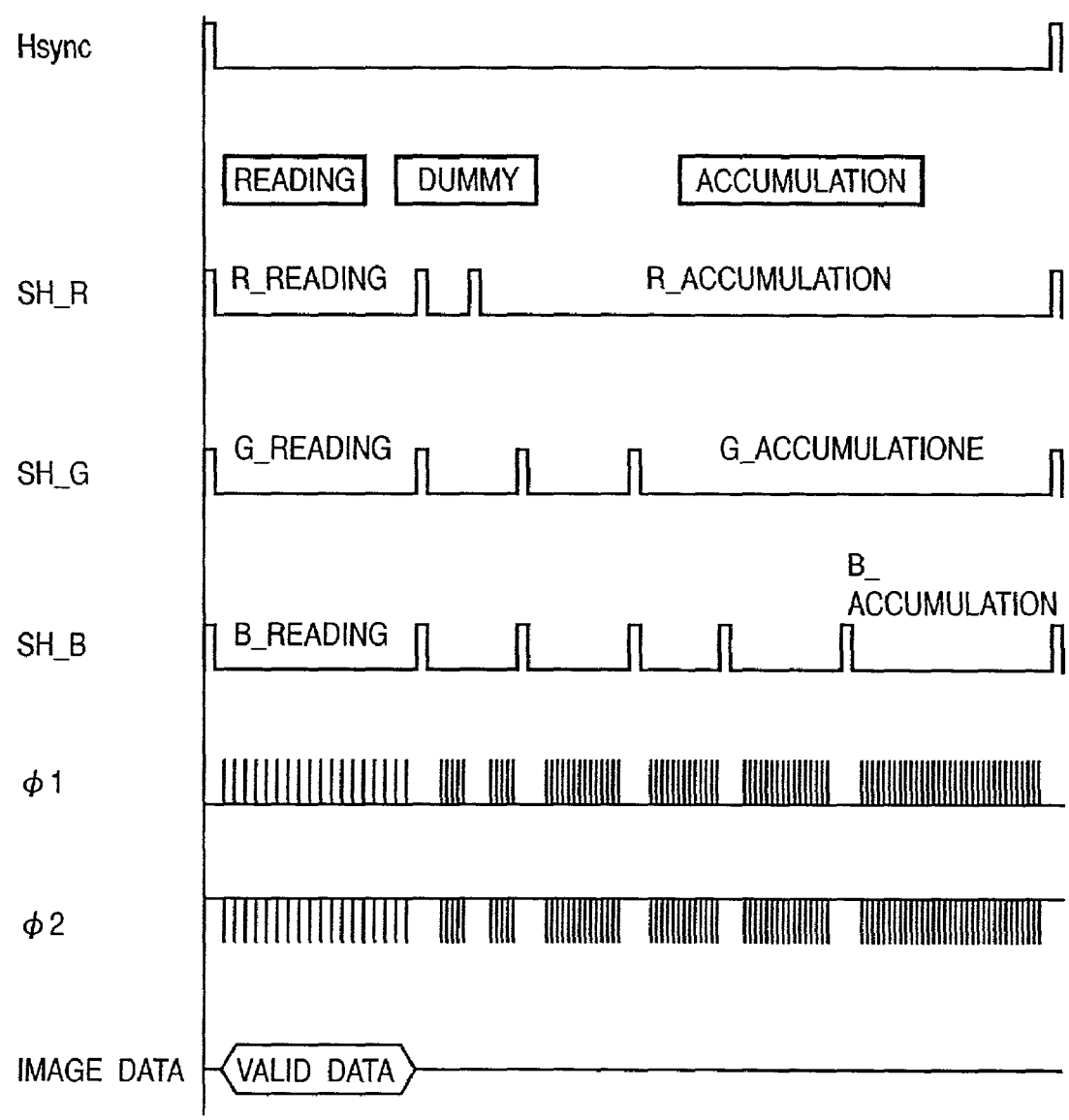
FIG. 7 is a timing chart showing a driving method for the image processing apparatus according to a third embodiment of the present invention.
Figure 8:
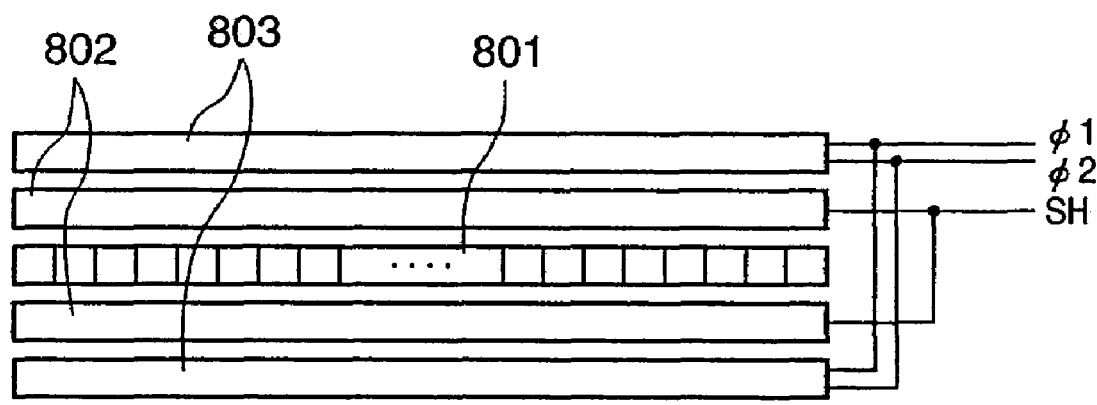
FIG. 8 is a schematic view of the structure of the conventional line sensor.
Figure 9:
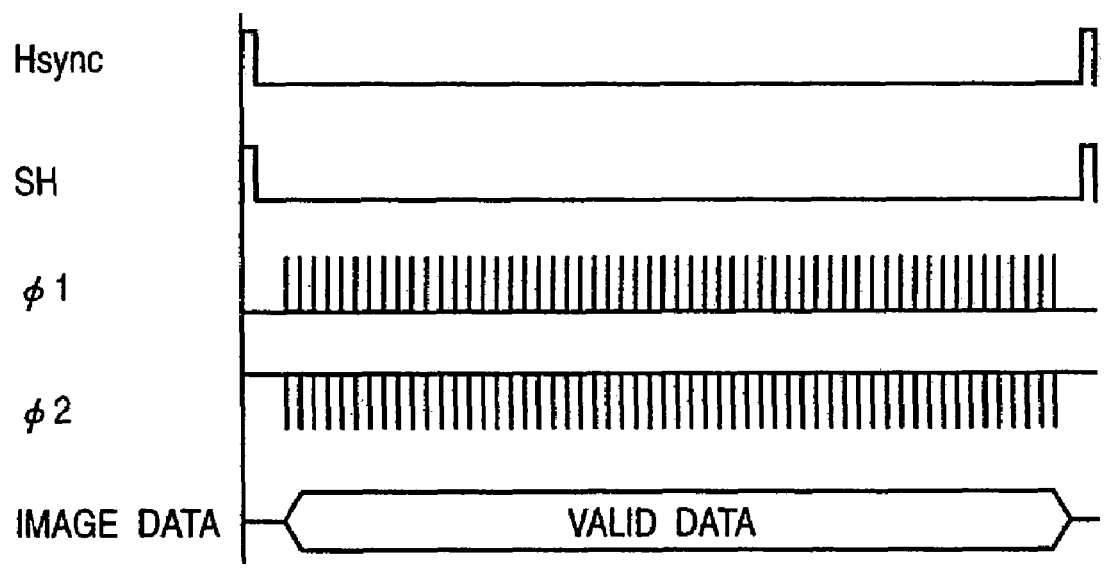
FIG. 9 is a timing chart showing the drive pulse and 1-line data processing in the conventional line sensor.
Figure 10:
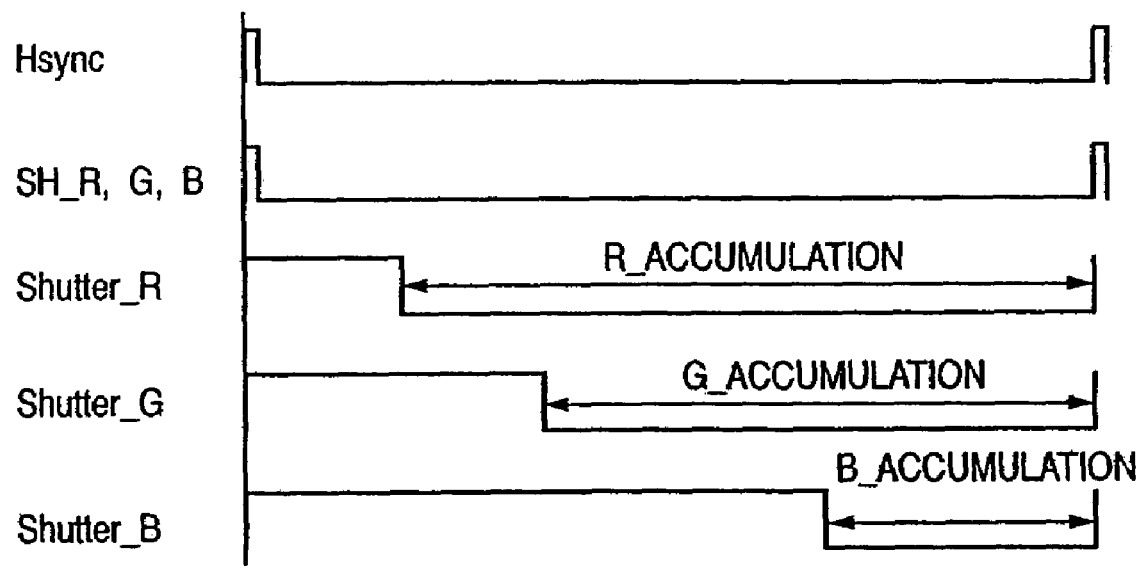
FIG. 10 is a timing chart showing the driving method for the color sensor with shutter function.

FIG. 7 is a timing chart showing the driving method for the image processing apparatus according to a third embodiment of the present invention.

In this embodiment, the SH pulses (SH_R, SH_G and SH_B) are periodically applied during the dummy section, so as to periodically read the accumulated electric charge.

In this arrangement, in addition to the advantages in the first embodiment, obtained is an advantage that the accumulation period of the dummy section can be prevented from becoming extremely long.

Note that the present invention also includes a case where, to operate various devices to realize the functions according to the embodiments, software program code is provided to a computer in an apparatus or a system connected to the various devices, and the computer of the system or apparatus (CPU or MPU) operates in accordance with the accumulated program.

In this case, the above software program code itself realizes the functions according to the above-described embodiments, and the program code itself, and means for providing the program code to the computer, e.g., an accumulation medium storing the program code, constitute the invention. As the accumulation medium storing the program code, a floppy disk, a hard disk, an optical disk, a magneto-optical disk, a CD-ROM, a magnetic tape, a non-volatile type memory card, a ROM and the like can be used.

Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the accumulation medium is written in a function expansion card which is inserted into the computer or in a memory provided in a function expansion unit which is connected to the computer, a CPU or the like contained in the function expansion card or unit performs a part or entire process in accordance with designations of the program code and realizes functions of the above embodiments.

In the image processing apparatus according to the present embodiment, in the first section, valid image data is read, in the third section, the electric charge accumulation periods are variable for the respective colors, and in the second section as a dummy section, the function of the third section is complemented. In this manner, as one line period is divided into first to third sections having different functions, the line sensor can be easily controlled, and valid electric charge accumulation period can be easily controlled for the respective colors without providing any particular mechanism such as shutters to the image sensor.

Further, as the transfer frequency for electric charge transfer in the first section is different from that in the second and third sections, unnecessary electric charge can be idle-transferred during a short accumulation period by selecting a line sensor drive pulse for a normal reading mode or a pulse for a high-speed mode only for transfer from the register, in one line.

Further, as the second section as a dummy section has a part where accumulated electric charge is periodically read out, electric charge remaining in the photo diodes can be removed.

In the above-described embodiments, the accumulation periods can be easily and reliably controlled for the respective colors by a simple method, and the freedom of color matching design can be increased in the entire image processing apparatus. Further, the lengths of the accumulation periods can be freely set for the respective colors without consideration of blooming and/or the limit of hardware processing speed in the subsequent stage.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   a line sensor which photoelectric-converts light into a signal then accumulates the signal, and outputs the signal as a 1-line electric signal; and
   a drive circuit which drives said line sensor such that one line period is divided into a first section for reading valid image data, a second section for storing dummy image data, and a third section for storing valid image data,
   wherein said line sensor includes a first line sensor and a second line sensor for storing different color signals, and wherein said drive circuit sets different accumulation periods for the respective colors by setting different second sections in said first line sensor and said second line sensor.

2. The image processing apparatus according to claim 1, wherein said drive circuit reads said dummy image data during said third section.

3. The image processing apparatus according to claim 1, wherein a transfer frequency for electric charge transfer in said first section is different from that in said second and third sections.

4. The image processing apparatus according to claim 3, wherein a product of duration of said second section and the transfer frequency of said second section is greater than that of duration of said first section and the transfer frequency of said first section.

5. The image processing apparatus according to claim 1, wherein accumulated electric charge is periodically read out during said second section.

6. An image processing apparatus comprising:
   plural photoreception accumulation portions which respectively perform photoelectric conversion and accumulate different color signals; and
   drive circuit which starts accumulation of new signal by reading signals accumulated in said photoreception accumulation portions, and sets accumulation periods for respective colors by changing timings of reading signals from said photoreception accumulation portions for the respective colors,
   wherein said drive circuit reads valid image data from said photoreception accumulation portions and then sets different dummy signal accumulation periods for each of the respective colors.

7. The image processing apparatus according to claim 6, wherein said drive circuit transfers dummy data at a speed higher than that for transferring said valid image data.

8. An image processing method comprising the steps of:
   photoelectric-converting light into a signal then accumulating the signal, and outputting the signal as a 1-line electric signal, by a line sensor; and
   driving said line sensor such that one line period is divided into a first section for reading valid image data, a second section for storing dummy image data, and a third section for storing the valid image data,
   wherein said line sensor includes a first line sensor and a second line sensor for storing different color signals, and wherein said drive circuit sets different accumulation periods for the respective colors by setting different second sections in said first line sensor and said second line sensor.

9. The image processing method according to claim 8, wherein said dummy image data is read during said third section.

10. The image processing method according to claim 8, wherein a transfer frequency for electric charge transfer in said first section is different from that in said second and third sections.

11. The image processing method according to claim 10, wherein a product of duration of said second section and the transfer frequency of said second section is greater than that of duration of said first section and the transfer frequency of said first section.

12. The image processing method according to claim 8, wherein accumulated electric charge is periodically read out during said second section.

13. A computer program embodied in a computer readable medium for executing the image processing method in claim 8.

14. A computer readable recording medium encoded with the program in claim 13.

* * * * *